(12) United States Patent
Liu

(10) Patent No.: US 10,715,718 B2
(45) Date of Patent: Jul. 14, 2020

(54) PHASE DETECT AUTO-FOCUS THREE DIMENSIONAL IMAGE CAPTURE SYSTEM

(71) Applicant: Taiwan Semiconductor Manufacturing Company, Ltd., Hsinchu (TW)

(72) Inventor: Chih-Min Liu, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 0 days.

(21) Appl. No.: 15/963,673

(22) Filed: Apr. 26, 2018

(65) Prior Publication Data

US 2019/0289218 A1 Sep. 19, 2019

Related U.S. Application Data

(60) Provisional application No. 62/643,270, filed on Mar. 15, 2018.

(51) Int. Cl.
| | |
|---|---|
| *H04N 5/232* | (2006.01) |
| *H04N 13/156* | (2018.01) |
| *H04N 5/369* | (2011.01) |
| *H04N 13/239* | (2018.01) |
| *H04N 13/00* | (2018.01) |

(52) U.S. Cl.
CPC ... *H04N 5/232122* (2018.08); *H04N 5/36961* (2018.08); *H04N 13/156* (2018.05); *H04N 13/239* (2018.05); *H04N 2013/0081* (2013.01)

(58) Field of Classification Search
CPC .......... H04N 5/232122; H04N 13/156; H04N 13/239; H04N 5/36961; H04N 2013/0081
See application file for complete search history.

(56) References Cited

U.S. PATENT DOCUMENTS

| | | | | |
|---|---|---|---|---|
| 8,077,964 B2 * | 12/2011 | Berestov | ................... | G06T 7/55 382/154 |
| 8,340,456 B1 * | 12/2012 | DaneshPanah | .... | H04N 5/23219 382/255 |
| 2012/0038751 A1 * | 2/2012 | Yuan | ................... | H04N 5/23232 348/51 |
| 2012/0057040 A1 * | 3/2012 | Park | ..................... | H04N 5/2254 348/222.1 |
| 2012/0162379 A1 * | 6/2012 | Dahi | ................... | H04N 5/23254 348/47 |
| 2014/0267602 A1 * | 9/2014 | Tzur | .................... | H04N 13/122 348/43 |
| 2015/0009357 A1 * | 1/2015 | Seibel | ................. | A61B 1/00172 348/222.1 |
| 2015/0016777 A1 * | 1/2015 | Abovitz | ................ | G06F 3/0304 385/37 |

(Continued)

*Primary Examiner* — Amy R Hsu
(74) *Attorney, Agent, or Firm* — Merchant & Gould P.C.

(57) ABSTRACT

Methods and systems for capturing a three dimensional image are described. An image capture process is performed while moving a lens to capture image data across a range of focal depths, and a three dimensional image reconstruction process generates a three dimensional image based on the image data. A two-dimensional image is also rendered including focused image data from across the range of focal depths. The two dimensional image and the three dimensional image are fused to generate a focused three dimensional model.

20 Claims, 7 Drawing Sheets

(56) References Cited

U.S. PATENT DOCUMENTS

| | | | | |
|---|---|---|---|---|
| 2015/0272428 A1* | 10/2015 | Nam | ............... | H04N 5/23212 |
| | | | | 600/109 |
| 2015/0373250 A1* | 12/2015 | Sfaradi | ............ | H04N 5/23212 |
| | | | | 348/345 |
| 2016/0266467 A1* | 9/2016 | Lou | ................. | H04N 5/23212 |
| 2017/0318280 A1* | 11/2017 | Nisenzon | ........... | H04N 5/2258 |
| 2018/0349378 A1* | 12/2018 | Galor Gluskin | ...... | G06F 16/434 |
| 2019/0246091 A1* | 8/2019 | Bikumandla | ........... | G06T 7/55 |

\* cited by examiner

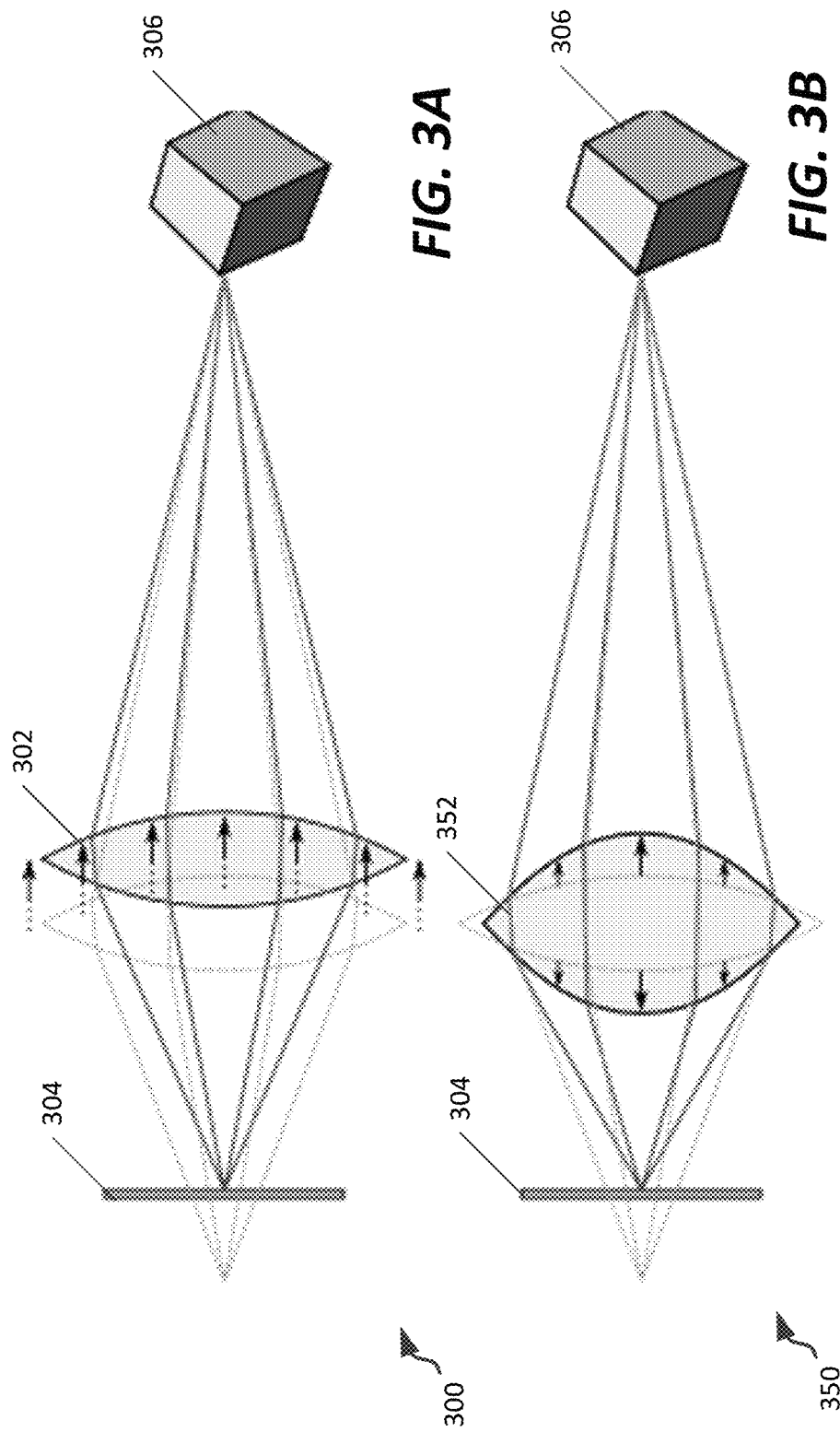

502  504

550

PHASE DETECT AUTO-FOCUS THREE DIMENSIONAL IMAGE CAPTURE SYSTEM

CROSS-REFERENCE TO RELATED APPLICATIONS

The present application claims priority from U.S. Provisional Patent Application No. 62/643,270, filed on Mar. 15, 2018, the disclosure of which is hereby incorporated by reference in its entirety.

BACKGROUND

Three dimensional image capture has a variety of uses, including in areas such as virtual reality, object modeling, and/or general image capture fields. To perform such three dimensional image capture, there are a number of possible solutions, including time of flight based image capture, structured light based image capture, and stereo vision. Each of these processes vary in terms of computational complexity, number of sensors required, available resolution (e.g., image quality), whether color images are available, and whether an additional light source is required.

For example, in the case of a time of flight image capture process, a light travel distance is used, and by measuring time of flight, a depth distance in an image can be calculated. With increased time granularity, finer depth calculations can be made. However, to achieve depth accuracy to within a millimeter, typically measurement must be made at the picosecond level, which requires substantial computational resources. Additionally, a special-purpose sensor may be needed (e.g., an SPAD array). In such cases, a larger pitch of such a special sensor may limit the X-Y direction resolution, limiting image quality. Still further, in some cases, a special purpose light source, such as a VCSEL (Laser array) or LED array (e.g., NIR LED) may be required.

In the case of structured light based image capture, a pattern of light is projected on a subject, and deformation of the light pattern by the subject is observed to detect a shape of the object. A camera offset from the pattern projector can review the shape of the pattern and calculate a distance/depth for each point within a field of view. Such systems are generally fast and relatively accurate since they can scan multiple points or an entire field of view at once; however, such systems require a very specific illumination source to accomplish depth calculations.

As such, many optical depth detection systems employ stereo vision techniques. Such systems typically employ two or more video cameras spaced from each other. By analyzing slight differences between images captured by each camera, a distance at each point in the images is possible. Although this does not require an additional light source (as in the case of a structured light based image capture process), it does require two sensors and significant computation to identify a matching point at which the two or more cameras can be focused. Matching points may be difficult to identify for objects with little or no texture.

As seen above, where additional light sources or sensors are required, cost, power, and computational complexity are all generally increased. However, in typical scenarios, such additional light sources or sensors are required for improved image quality.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A illustrates one method of adjusting a lens to perform three-dimensional image capture using the method and system of FIGS. 1-2.

FIG. 3B illustrates one method of adjusting a lens to perform three-dimensional image capture using the method and system of FIGS. 1-2.

DETAILED DESCRIPTION

Figure 1:
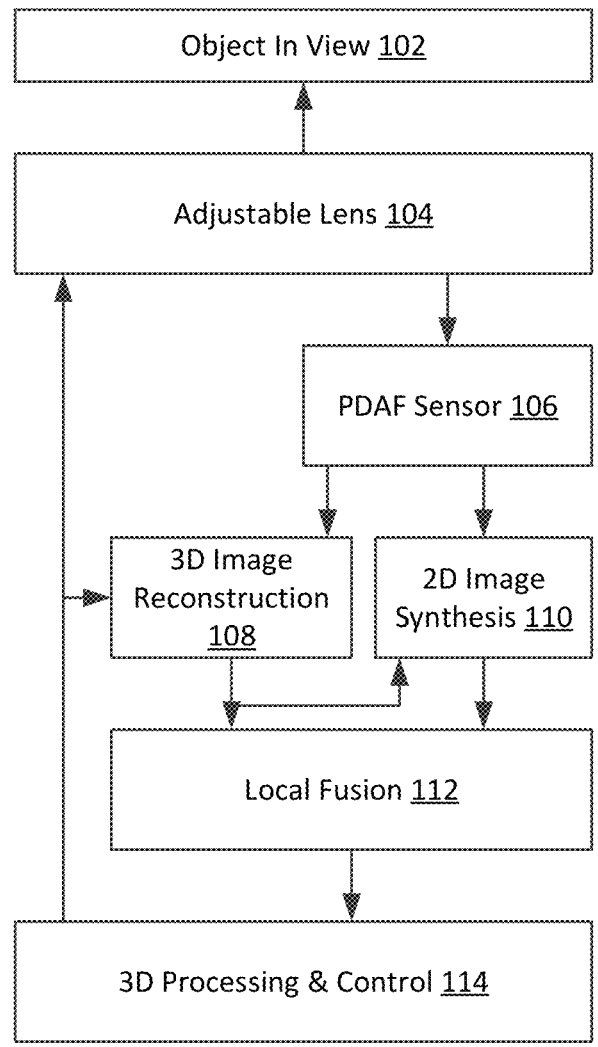
FIG. 1 is a block diagram of a system for performing three-dimensional image capture in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Referring generally to FIGS. 1-7, methods and systems for formation of three-dimensional images are provided. In example aspects, a phase detect auto-focus (PDAF) image sensor can be used in conjunction with a movable focal lens to capture image data over a depth range. The image data can then be parsed to assess depths of objects in the image data, and focused portions of two dimensional images are used to create a focused, consolidated three-dimensional image. By way of comparison to existing systems, improved depth detection in combination with limited need for additional light sources and/or multiple image sensors provide a solution with improved speed and efficiency in generating such in-focus, three-dimensional images, and at lower cost due to fewer components. Additionally, inclusion of devices with such improved efficiency into various movable devices, such as devices with movement sensors, can allow for detailed three-dimensional modeling, which may have additional applications in areas such as virtual reality and/or mapping or modeling of contour and depth features.

Referring first to FIG. 1, a block diagram of a system 100 for performing three-dimensional image capture is shown, in accordance with some embodiments. In the example shown, the system 100 can act on an object in view 102. The object in view can be a scene or a particular object within a scene.

In the embodiment shown, an adjustable lens 104 is oriented toward the object in view, and positioned between the object in view 102 and an image sensor, such as a phase detect auto-focus (PDAF) image sensor 106. The adjustable lens 104 is adjustable to a plurality of different focal lengths. This can be accomplished in a number of different ways. Example methods of adjusting focal length are illustrated in FIGS. 3A-3B, below, and generally include moving the adjustable lens 104 by adjusting either a position of the lens, or a shape of the lens. By moving the lens through a motion range, a range of different focal lengths is achieved.

Figure 4A:
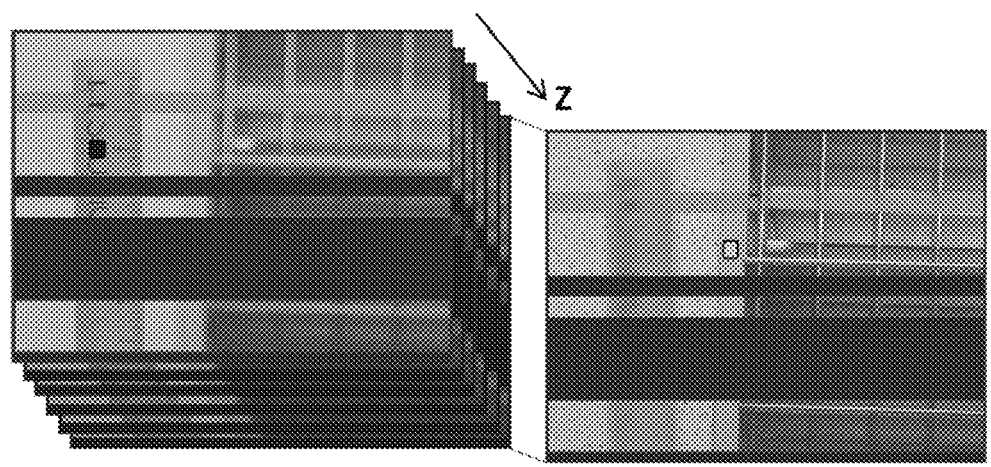
FIG. 4A illustrates an array of two-dimensional images useable to generate a three-dimensional image using the principles of the present disclosure.
Figure 4B:
FIG. 4B illustrates different color levels at a particular focus depth in example image data.
Figure 4C:
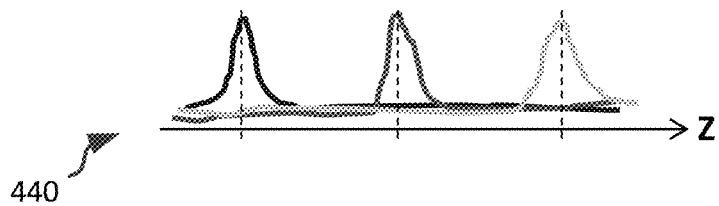
FIG. 4C illustrates a light intensity at an image sensor for various pixels along a depth axis as captured by a phase detect auto-focus sensor.

In example embodiments, the PDAF image sensor 106 captures image data associated with the object in view 102 (i.e., the viewing range of the PDAF sensor 106). A series of images can be captured in the image data, such that image data is captured across the range of focal lengths, or depths from the image sensor (in a "Z" direction in a field of view). An example of such a series of images included in image data is illustrated in FIGS. 4A-4C, below.

In the embodiment shown, image data from the PDAF sensor 106 is provided to a three-dimensional image reconstruction module 108 and a two-dimensional image synthesis module 110. The three-dimensional image reconstruction module 108 determines a depth of objects within the field of view of the PDAF sensor 106. This can be accomplished, for example, by determining a depth of pixel focus for each pixel, with the depth of pixel focus being The three-dimensional image reconstruction module 108 can be implemented using, for example, a combination of image processing circuitry associated with the PDAF sensor 106 and/or a processing unit (e.g., a CPU) to which the PDAF sensor 106 is communicatively connected, and which is programmed to perform such depth calculations. In example embodiments, the processing unit can be included in a mobile device, such as the mobile device of FIG. 7.

Figure 5A:
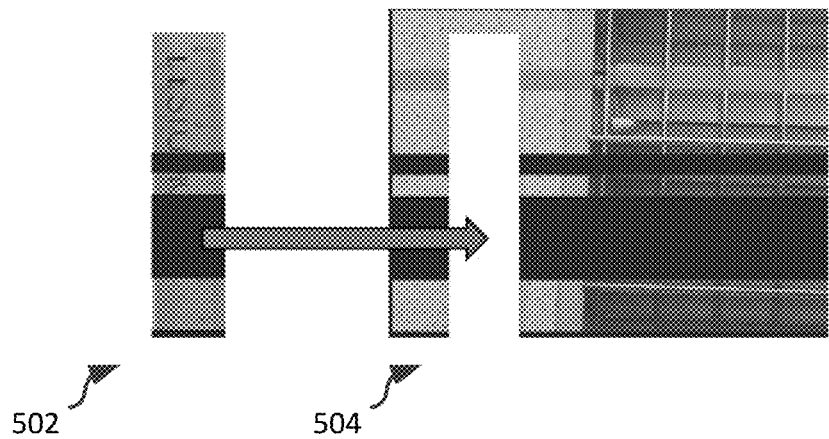
FIGS. 5A and 5B illustrate synthesis of focused portions of image data into a consolidated two-dimensional image, according to an example embodiment.
Figure 5B:
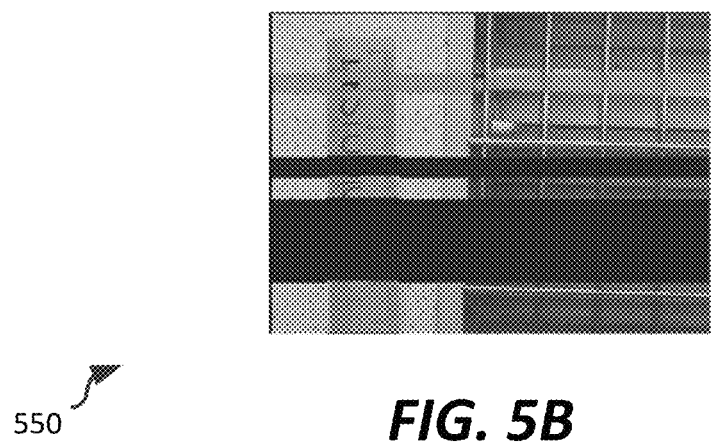

The two-dimensional image synthesis module 110 develops a focused two-dimensional image from the image data. This can include combining focused pixels from different pixels of the PDAF sensor 106 to form a focused two-dimensional image, e.g., from image data captured from each pixel at varying focal depths (e.g., the depth at which each pixel is in focus). The two-dimensional image synthesis module 110 can be implemented using, for example, a combination of image processing circuitry associated with the PDAF sensor 106 and/or a processing unit (e.g., a CPU) to which the PDAF sensor 106 is communicatively connected, and which is programmed to perform such image construction, e.g., as seen in FIGS. 5A-5B. In example embodiments, the processing unit can be included in a mobile device, such as the mobile device of FIG. 7.

Figure 7:
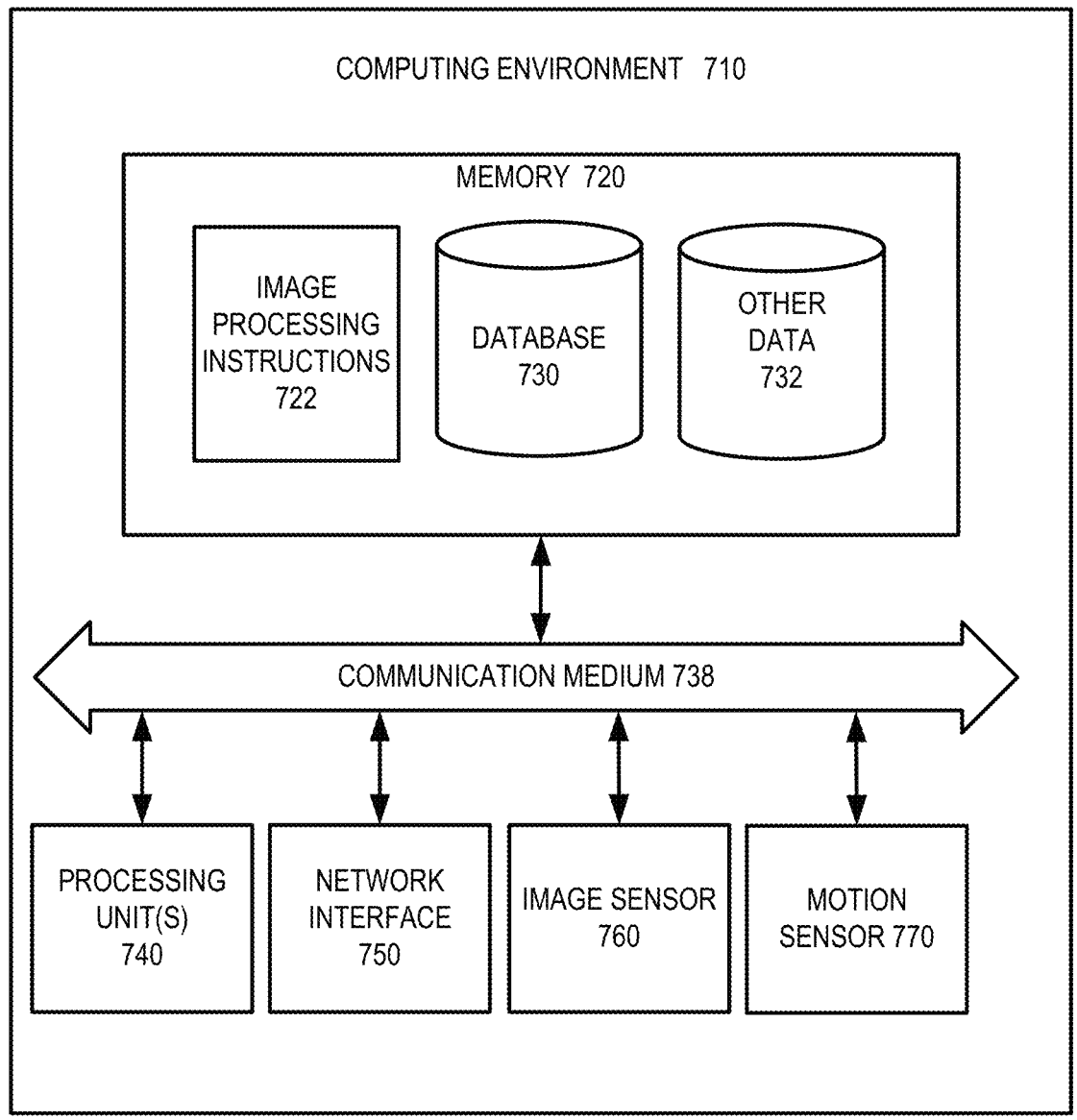
FIG. 7 is a block diagram of an example device with which aspects of the present disclosure can be implemented.

A local fusion component 112 fuses the depth information generated by the three-dimensional image reconstruction module 108 to form a combined image having focused two-dimensional image data associated with depth information. The local fusion component 112 can be implemented using a processing unit as noted above. A three-dimensional processing and control unit 114 can also be implemented in the processing unit. The three-dimensional processing and control unit 114 can provide a variety of control functions and image processing features. For example, the three-dimensional processing and control unit 114 can generate a three-dimensional model and further control the overall system 100 to re-sweep and capture additional image data, e.g., to improve resolution at specific depth are area around an object of interest. Additionally, the three-dimensional processing and control unit 114 can be interfaced to other sensors and/or lenses for purposes of capturing multiple sets of image data concurrently. Still further, the three-dimensional processing and control unit 114 can be interfaced to a motion sensor associated with the system 100 (e.g., as would be present in a mobile device such as seen in FIG. 7, below).

Figure 2:
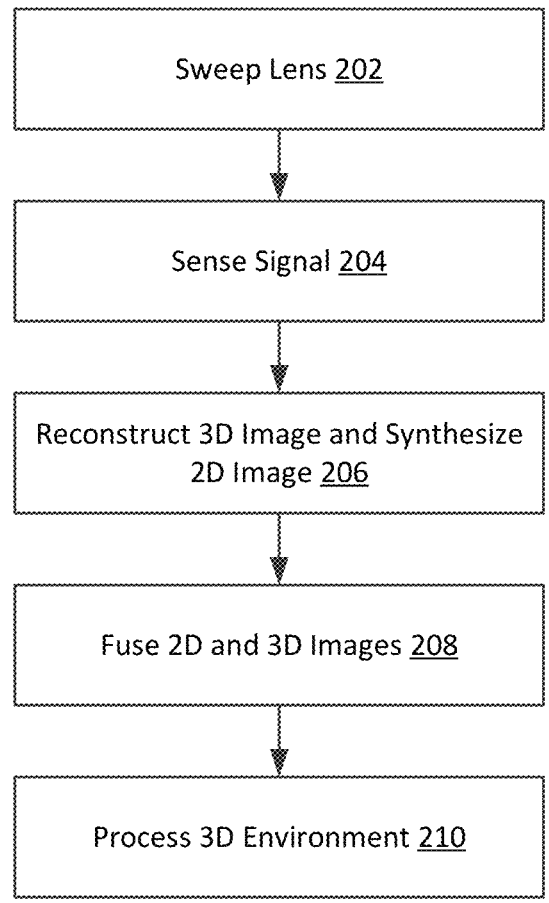
FIG. 2 is a method of capturing three-dimensional images in accordance with some embodiments.

Referring to FIG. 2, a method 200 of capturing three-dimensional images in accordance with some embodiments is shown. The method 200 can be performed, for example, using the system 100 of FIG. 1. In the embodiment shown, the method 200 can include sweeping a lens through a range of depths (step 202). The sweep of the lens can include any change of lens position or shape that causes a change in the focal depth of the lens. During the lens sweep, an image sensor, such as a PDAF sensor 106 as discussed above, can be used to sense image signals. In example embodiments, the PDAF sensor 106 can capture a plurality of images over the entire sensor at each of a plurality of depths through a depth range defined by the lens sweep (step 204).

Once image data is captured, a three dimensional image is reconstructed, and a two dimensional image synthesized (step 206). This can be performed using the modules 108, 110 of FIG. 1. In general, the three dimensional image includes image data as well as depth information, while the two dimensional image includes a composite, focused image based on focused pixels at a plurality of focal depths. The two-dimensional and three-dimensional images can then be fused, forming a focused three dimensional model that includes both focused image data at each pixel location (in the X-Y directions) as well as depth information gathered based on the depth at which such focus occurs (as determined by the lens sweep) (step 208). Optionally, a three-dimensional environment can be processed (step 210). This can include building a three-dimensional model of an environment, for example via multiple performances of steps 202-208. Various types of processing may be performed. For example, the additional processing can include, for example, re-scanning (re-sweeping, and capturing image data) over a subset of the overall depth range initially used, or scanning an object of interest from a different angle, and coordinating images to develop an overall model of a three-dimensional object based on the image data from multiple perspectives (e.g., including image data that would not be visible from the field of view of the PDAF sensor when in an initial position). Other types of processing are possible as well.

Referring now to FIGS. 3A-3B, different types of lens sweeping are illustrated. FIG. 3A illustrates schematic view of a first lens sweeping process, in which a lens 302 is moved in position relative to an image sensor 304, thereby changing a depth of focus on the object of interest 306. FIG. 3B illustrate a schematic view 350 of a second lens sweeping process 350 in which a lens 352 is moved in shape between the image sensor 304 and object of interest, thereby also changing a depth of focus on the object of interest 306.

Referring to FIGS. 4A-4C, an example of three-dimensional image processing based on image data captured during a sweep of the lens is illustrated. In FIGS. 4A-4C, image data is captured across a range of depths. In FIG. 4A, a schematic illustration of a series 400 of two-dimensional images are captured at different focal depths is shown. In the example shown, a near object (a ruler) and a far object (a gate) are within the same field of view. As depth increases with sweeping of a lens, the near object will change from in-focus to out of focus, while the far object will come into focus. This change in focus of the lens results in different sensed light levels reaching the image sensor.

As seen in FIGS. 4B-4C, each of the lens positions is stored in association with a portion of the captured image data that represents a distance from the image sensor. In FIG. 4B, image data 420 represents different shades/colors captured at a particular depth. In FIG. 4C, a pixel focus depth diagram 440 is illustrated. In this diagram 440, it can be seen that different pixel intensities will result at different depths for different pixels, which indicates a corresponding depth of an object that is in focus for that particular pixel. Each pixel of a PDAF image sensor can be focused at a different lens position, and when a lens reaches a particular focal depth, that pixel may come into focus. For example, when considering FIGS. 4A and 4C, it is seen that in a near image, a first pixel (e.g., a blue pixel) can be in focus, and therefore have a high sensed PDAF focus agreement value, and in a far image, a different pixel (e.g., a yellow pixel) can be in focus, and therefore have a high sensed PDAF focus agreement value. As such, focused pixels are associated with specific depths, and therefore image depth is obtained.

It is noted that, consistent with the present disclosure, to the extent specific objects appear within a field of view of an image sensor, additional lens sweep and image processing can occur, e.g., to oversample within a particular lens position range (focal depth) or over the entire focal range. This may improve depth accuracy, to the extent lens positional accuracy has variance. It can also reduce noise in depth calculations.

Referring to FIGS. 5A-5B a two dimensional image synthesis process is illustrated, using the image data illustrated in FIG. 4A. As seen in FIG. 5A, a near field image portion 502 (an area in which a near object is in focus) and a far field image portion 504 (an area in which a far object is in focus) are merged, forming the synthesized two-dimensional image 550 of FIG. 5B.

Referring to FIGS. 1-5 generally, it is noted that by both synthesizing a two-dimensional image and performing three-dimensional image reconstruction, depth data at each pixel position of an image sensor can be accomplished, while obtaining an in-focus two-dimensional image at each image depth. Furthermore, and as noted above, specific scanning or sweep processes can be performed to either improve accuracy of depth information, or to obtain a further fused image including focused two dimensional information and depth information from a different position/perspective. A variety of applications of such a process are possible, a few of which are described further below.

Figure 6:
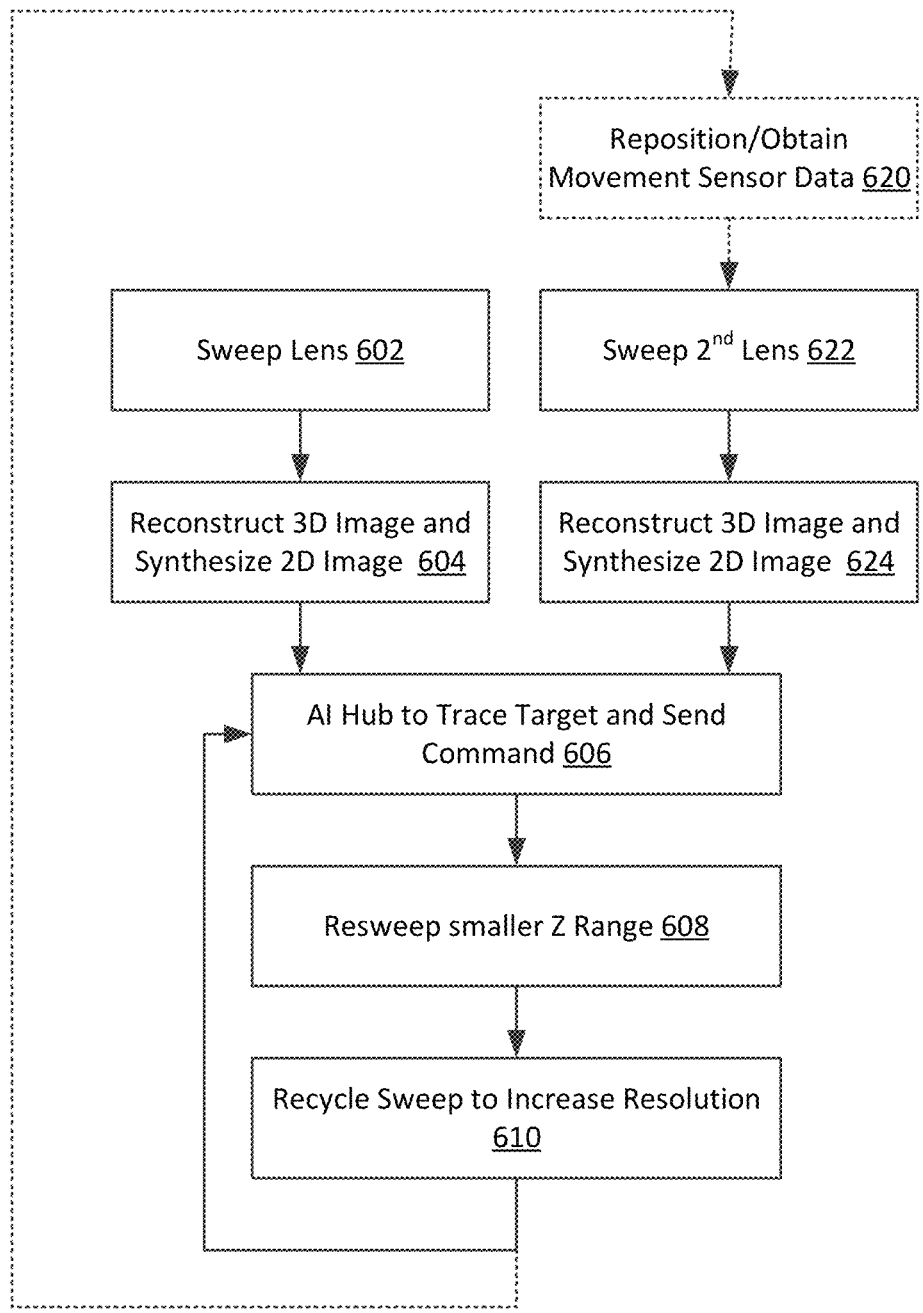
FIG. 6 illustrates a method by which a three-dimensional model can be built using principles of the present disclosure.

Referring now to FIG. 6, a flowchart of a method 600 by which a three-dimensional model can be built is illustrated. The method 600 allows such a model to be built using a system such as illustrated in FIGS. 1-5, above, and can be implemented in a variety of types of computing devices, including mobile computing devices.

In the example shown, the method 600 includes sweeping a lens through a range of focal depths (step 602), as well as reconstructing a three-dimensional image and synthesizing a two dimensional image (step 604) as discussed above in connection with FIGS. 1-2. The reconstructed and synthesized images are then provided to an artificial intelligence component at which a three-dimensional model can be defined (step 606). This can be performed, for example, by tracing a target based on changes in depth data between adjacent pixels, as well as visible edges in the two-dimensional images that are synthesized.

Optionally, a resweep operation (step 608) can be performed in which depths having such a target object are included, to improve resolution. This can be done within a subset of the depth range of the original sweep operation performed in step 602 based on the determination from the artificial intelligence component, or at a different sweep pace (e.g., faster or slower to improve resolution). Additionally, the sweep information can be recycled to increase resolution (e.g. by oversampling (step 610) by resweeping over the entire range. This sweeping or resweeping process can be repeated with results passed to the artificial intelligence component as often as is desired, to obtain reliable depth information.

Still further, in some embodiments, the system or device used to perform the method 600 may be repositionable, or may include a plurality of lenses. As such, an optional repositioning (step 620) could be performed to obtain three-dimensional image data from a different perspective. In such cases, a second sweeping is performed (step 622) either using the same lens as is used in steps 602-604 in a different position, or a different lens in that different position. If a different lens and image sensor is used, optionally also no repositioning may be needed for an overall system or device, since separate image sensors can obtain image data from different perspectives.

A second process in which reconstructing a second three-dimensional image and synthesizing a second two dimensional image is performed can then occur (step 624) using the image data captured during the second sweeping of step 622. The second images can be provided to an artificial intelligence component at which an overall three dimensional model can further be defined (at step 606). It is noted that the artificial intelligence component can perform step 606 iteratively to improve an overall three-dimensional model or can be performed using multiple image sensors in parallel to obtain the three-dimensional model.

Overall, it is noted that the method 600 can have a number of applications. For example, obtaining focused two-dimensional image data and depth information from a plurality of perspectives can allow a device to form a complete three-dimensional model of an object by performing a process from various perspectives around the object. If this were performed, for example, using a mobile device, iterative processing while moving the device around an object would allow a complete three-dimensional model of that object to be obtained, with the artificial intelligence component being used to merge image data to recognize the object as a common object across iterations.

Referring now to FIG. 7, an example computing device 700, such as a mobile device, is disclosed. The computing device 700 is an example of a device useable to implement the systems and methods described above. In the example, the system 700 can include a computing environment 710. The computing environment 710 can be a physical computing environment, or include one or more virtualized or cloud-based components. The computing environment 710 can include memory 720, a communication medium 738, one or more processing units 740, a network interface 750, and one or more additional devices, such as image sensor 760 and motion sensor 770.

The memory 720 can include a computer readable storage medium. The computer storage medium can be a device or article of manufacture that stores data and/or computer-executable instructions. The memory 720 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 720 can store various types of data and software. For example, as illustrated, the memory 720 includes image processing instructions 722 for implementing one or more aspects of the image processing methods described herein, database 730 (e.g., for storing image data), as well as other data 732 (such as depth data or image metadata). In some examples (e.g., where the computing environment 710 is a user device, such as a mobile device), the memory 720 can include instructions for displaying such information or a three-dimensional model, or communicating that information via network interface 750 to a remote device.

The communication medium 738 can facilitate communication among the components of the computing environment 710. In an example, the communication medium 738 can facilitate communication among the memory 720, the one or more processing units 740, the network interface 750, and the external component interface 760. The communications medium 738 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 740 can include physical or virtual units that selectively execute software instructions. In an example, the one or more processing units 740 can be physical products comprising one or more integrated circuits. The one or more processing units 740 can be implemented as one or more processing cores. In another example, one or more processing units 740 are implemented as one or more separate microprocessors. In yet another example embodiment, the one or more processing units 740 can include an application-specific integrated circuit (ASIC) that provides specific functionality. In yet another example, the one or more processing units 740 provide specific functionality by using an ASIC and by executing computer-executable instructions.

The network interface 750 enables the computing environment 710 to send and receive data from a communication network. The network interface 750 can be implemented as an Ethernet interface, a token-ring network interface, a fiber optic network interface, a wireless network interface (e.g., WI-FI), or another type of network interface.

The image sensor 760 can include one or more image sensors and associated physical devices in association with such image sensors, such as lenses or other devices useable to focus light to be captured by the image sensor(s). In an example embodiment, the image sensor 760 comprises a PDAF sensor, such as PDAF sensor 106, as well one or more associated movable lenses. In other embodiments, the image sensor 760 represents a plurality of image sensors.

The motion sensor 770 can be a position or motion sensor (e.g., an accelerometer and/or gyroscope) useable to detect position/orientation and movement of the computing environment 710, for purposes of more accurately calculating depth information. The position/orientation and/or movement information can be used by the image processing instructions 722, in combination with image data captured by the image sensor 760, to generate three-dimensional models as discussed herein. Accoridngly, the image processing instructions 722 can implement three-dimensional image processing, two-dimensional image synthesis, as well as object modeling, e.g., by implementing an artificial intelligence component.

Although illustrated as being components of a single computing environment 710, the components of the computing environment 710 can be spread across multiple computing environments 710. For example, one or more of instructions or data stored on the memory 720 may be stored partially or entirely in a separate computing environment 710 that is accessed over a network.

Referring to FIGS. 1-7 generally, it is noted that the methods and systems of the present disclosure have a number of possible advantages over existing three-dimensional image capture systems. For example, to obtain both depth and focused two dimensional image data, only a single image sensor is required, and no external source of light is required. However, when additional image sensors in different positions are provided, or where the image data captured by a single image sensor from multiple positions is fused with positional or movement data, accurate object modeling is possible. Furthermore, since the three-dimensional and two-dimensional image processing using, e.g., a PDAF image sensor can be performed quickly, areas (depths) of interest can quickly be rescanned to improve depth accuracy and/or reduce noise in depth calculations.

Accordingly, in some embodiments, a method of capturing a three-dimensional image includes performing an image capture process while moving a lens to capture image data across a range of focal depths, and performing a three dimensional image reconstruction process to generate a three dimensional image based on the image data. The method also includes rendering a two-dimensional image including focused image data from across the range of focal depths, and fusing the two dimensional image with the three dimensional image to generate a focused three dimensional model.

In further example embodiments, a device for capturing three-dimensional images includes a phase detect auto-focus image sensor, a lens movable across a range of focal depths, and a processor operatively connected to the phase detect auto-focus image sensor and having a signal interface to a lens movement component. The device further includes a memory communicatively coupled to the processor. The instructions cause the device to perform an image capture process while moving a lens to capture image data across a range of focal depths, and perform a three dimensional image reconstruction process to generate a three dimensional image based on the image data. The instructions further cause the device to render a two-dimensional image including focused image data from across the range of focal depths, and fuse the two dimensional image with the three dimensional image to generate a focused three dimensional model.

In still further example embodiments a method of capturing a three-dimensional image includes performing a first image capture process using a mobile device in a first position while moving a lens to capture image data across a range of focal depths using a phase detect auto-focus sensor and without using an associated light source for illuminating objects within the field of view of the phase detect autofocus sensor. The method also includes performing a three dimensional image reconstruction process to generate a three dimensional image based on the image data, and rendering a two-dimensional image including focused image data from across the range of focal depths. The method includes fusing the two dimensional image with the three dimensional image to generate a focused three dimensional model, and performing a second image capture process using the mobile device in a second position while moving the lens to capture second image data across a second range of focal depths, as well as performing a three dimensional image reconstruction process to generate a second three dimensional image based on the second image data. The method further includes rendering a second two-dimensional image including focused image data from across the second range of focal depths, and fusing the second two dimensional image with the second three dimensional image to generate a second focused three dimensional model. A target object can then be traced using an artificial intelligence component, and a three-dimensional model of the object of interest can be generated based on the target object, the focused three dimensional model, and the second focused three dimensional model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of capturing a three-dimensional image, the method comprising:
   performing an image capture process while moving a lens to capture image data across a range of focal depths using a phase detect auto-focus sensor, wherein the phase detect auto-focus sensor has a plurality of pixels, and a pixel focus depth is determined for each pixel;
   performing a three dimensional image reconstruction process to generate a three dimensional image based on the image data;
   rendering a two-dimensional image including focused image data from across the range of focal depths; and
   fusing the two dimensional image with the three dimensional image to generate a focused three dimensional model.

2. The method of claim 1, wherein moving the lens includes changing a shape of the lens to cause the range of focal depths.

3. The method of claim 1, wherein moving the lens includes changing a position of the lens to cause the range of focal depths.

4. The method of claim 3, wherein changing the position of the lens includes changing at least one of a pace, a range or a direction of movement of the lens.

5. The method of claim 1, further comprising performing a second image capture process while moving the lens to cause a second range of focal depths, the second range of focal depths being a subset of the range of focal depths.

6. The method of claim 5, wherein the second range comprises a range of focal depths at which an object of interest is identified in the image data.

7. The method of claim 1, wherein rendering the two dimensional image includes selecting from the image data focused image data from different focal depths across the range of focal depths.

8. The method of claim 1, further comprising capturing at least one of motion information or position information from a device including the lens.

9. The method of claim 8, wherein the focused three dimensional model is based on a plurality of two dimensional images and three dimensional images captured at a plurality of different positions.

10. The method of claim 8, further comprising tracing a target object using an artificial intelligence component.

11. The method of claim 10, further comprising performing a second image capture process while moving the lens to cause a second range of focal depths, the second range of focal depths being a subset of the range of focal depths.

12. A device for capturing three-dimensional images, the device comprising:
    a phase detect auto-focus image sensor, wherein the phase detect auto-focus image sensor has a plurality of pixels, and a pixel focus depth is determined for each pixel;
    a lens movable across a range of focal depths;
    a processor operatively connected to the phase detect auto-focus image sensor and having a signal interface to a lens movement component;
    a memory communicatively coupled to the processor, the memory storing instructions which, when executed, cause the device to:
    perform an image capture process while moving a lens to capture image data across a range of focal depths;
    perform a three dimensional image reconstruction process to generate a three dimensional image based on the image data;
    render a two-dimensional image including focused image data from across the range of focal depths; and
    fuse the two dimensional image with the three dimensional image to generate a focused three dimensional model.

13. The device of claim 12, wherein the device comprises a mobile device.

14. The device of claim 12, further comprising a motion sensor configured to track movement of the device.

15. The device of claim 14, wherein the device is further configured to perform the image capture process at a plurality of different positions.

16. The device of claim 15, wherein the device is further configured to identify an object of interest included in the image data and trace the object of interest using an artificial intelligence component.

17. The device of claim 16, wherein the device is further configured to perform a second image capture process while moving the lens to cause a second range of focal depths, the second range of focal depths being a subset of the range of focal depths focused on the object of interest.

18. The device of claim 17, wherein the device is configured to generate a three-dimensional model of the object of interest.

19. A method of capturing a three-dimensional image, the method comprising:
   performing a first image capture process using a mobile device in a first position while moving a lens to capture image data across a range of focal depths using a phase detect auto-focus sensor and without using an associated light source for illuminating objects within the field of view of the phase detect auto-focus sensor;
   performing a three dimensional image reconstruction process to generate a three dimensional image based on the image data;
   rendering a two-dimensional image including focused image data from across the range of focal depths;
   fusing the two dimensional image with the three dimensional image to generate a focused three dimensional model;
   performing a second image capture process using the mobile device in a second position while moving the lens to capture second image data across a second range of focal depths;
   performing a three dimensional image reconstruction process to generate a second three dimensional image based on the second image data;
   rendering a second two-dimensional image including focused image data from across the second range of focal depths;
   fusing the second two dimensional image with the second three dimensional image to generate a second focused three dimensional model;
   tracing a target object using an artificial intelligence component; and
   generating a three-dimensional model of the object of interest based on the target object, the focused three dimensional model, and the second focused three dimensional model.

20. The method of claim 19, wherein the phase detect auto-focus sensor has a plurality of pixels, and a pixel focus depth is determined for each pixel.

\* \* \* \* \*